Patented June 18, 1929.

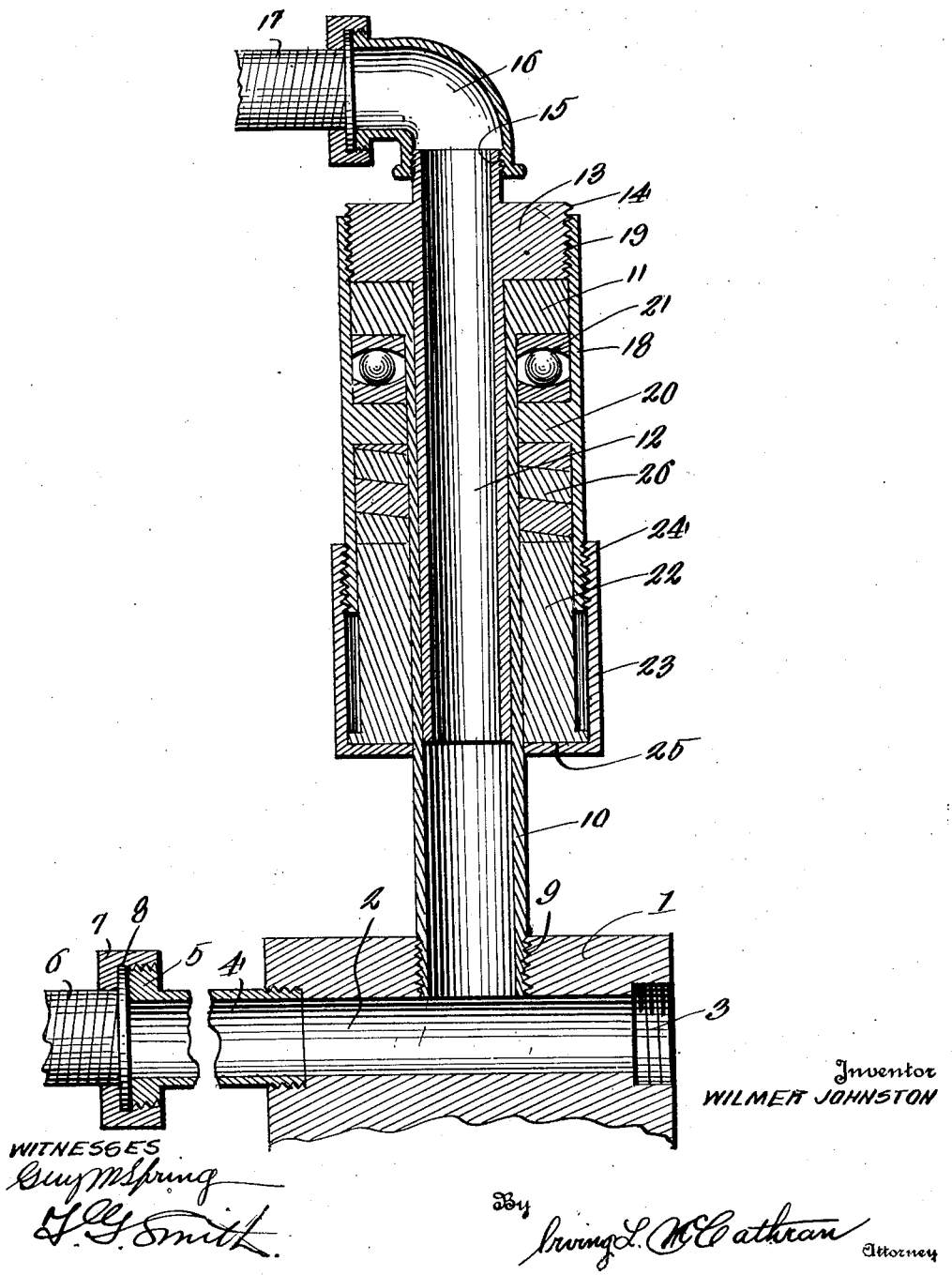

1,717,846

UNITED STATES PATENT OFFICE.

WILMER JOHNSTON, OF LOVELAND, COLORADO.

SWIVEL JOINT FOR PIPES.

Original application filed April 2, 1926, Serial No. 99,377. Divided and this application filed December 31, 1927. Serial No. 243,938.

This invention relates to improvements in swivel joints for pipes and constitutes a division of my application filed April 2, 1926, Serial No. 99,377.

The invention forming the subject matter of my above identified copending application is a lubricating apparatus designed primarily for supplying lubricant to the roller shaft bearings of roller mills, the lubricant being supplied through the medium of a pipe leading from the source of supply, to delivery pipes which lead radially from the upper end of the main shaft of the mill to the bearings for the upper ends of the roller shafts of the mill, and the present invention resides in the provision of a novel swivel joint for establishing communication between the lubricant supply pipe and the said delivery pipes.

While the accompanying drawing and the description which is to follow, constitute a disclosure of the preferred embodiment of the invention, it will be understood that various changes may be made within the scope of what is claimed.

The figure of the accompanying drawing is a vertical sectional view through the joint embodying the invention and illustrating so much of the lubricant supply and delivery pipes as is essential to an understanding of the invention.

In the drawing the numeral 1 indicates the upper end portion of the main shaft of a roller mill, and this end of the said shaft is provided with one or more diametrically extending bores indicated by the numeral 2, the figure of the drawing illustrating one such bore formed in the upper end of the said shaft, and by reference to the drawing it will be observed that the ends of this bore are enlarged and threaded as indicated by the numeral 3 so as to accommodate relatively short couplings 4 having enlarged exteriorly threaded outer ends 5 to which the inner ends of flexible delivery pipes 6 are connected as for example by a nut 7 threaded to the enlarged outer end 5 of the respective coupling 4 and binding against a flange 8 provided at the inner end of the delivery pipe 6, it being understood however that any suitable connection may be provided between the delivery pipes 6 and the ends of the bore or bores 2 in the shaft 1. In its upper end the shaft is formed, axially, with a threaded opening 9 into which is fitted the lower threaded end of an upright tubular member 10 which, at its upper end, is provided exteriorly with a circumferential enlargement providing a collar 11 which is integral with the said member. Snugly fitted within the tubular member 10 is a companion tubular member 12 which is provided adjacent its upper end with a circumscribing shoulder 13 exteriorly threaded as indicated by the numeral 14, the lower side of the shoulder 13 resting upon the upper side of the collar 11. The upper end of the tubular member 12, above the shoulder 13, is exteriorly threaded as at 15, and fitted thereto is one end of an elbow coupling 16 to the other end of which is connected a pipe 17 which may be flexible or rigid, as found expedient, and to which the lubricant is to be supplied, from a source of supply (not shown).

A cylindrical sleeve 18 is interiorly threaded at its upper end as indicated by the numeral 19 and fitted to the threaded shoulder 13, and this sleeve is provided intermediate its upper and lower ends, interiorly, with an integral spacing collar indicated by the numeral 20, a thrust ball bearing 21 being interposed between the under side of the collar 11 and the upper side of the collar 20.

A bushing 22 is fitted at its upper end into the lower end of the sleeve 18 and is supported in proper position with respect to the sleeve and in position surrounding the tubular member 10, by means of a cylindrical cap 23 which is threaded as at 24, onto the lower end of the said sleeve 18, the cap being provided at its lower end with an annular inwardly projecting flange 25 which engages the lower end of the said bushing 22. A suitable helically arranged packing 26 is arranged within the sleeve 18 and is confined between the under side of the collar 20 and the upper end of the bushing 22.

In assembling the parts comprising the coupling, the tubular member 12 is first inserted into the upper end of the companion tubular member 10 after which the thrust bearing 21 is arranged upon the member 10 and engaged against the under side of the shoulder 13. The sleeve 18 is then fitted onto the tubular member 10 and threaded to the shoulder 13, and adjusted so as to bring the upper side of the collar 20 into proper bearing engagement with the ball bearing 21. The packing 26 is then arranged in place upon the tubular member 10 and the bushing 22 is fitted onto said member and at its upper end into the lower end of the sleeve 18 to bear at its said end against the packing, after which the cap 23 is fitted onto the said tubular member 10 and threaded onto the lower end of the sleeve 18 to bring its flange 25 into engagement against the lower end of the bushing 22 thus adjusting the bushing, upon further threaded adjustment of the said cap 23, so as to cause the same to suitably compress the packing 26.

From the foregoing description of the invention it will be evident that while the tubular member 10 may rotate freely about the tubular member 12, which latter member is stationary, and lubricant may be supplied from the pipe 17 through the coupling 16 and the tubular members 12 and 10 to the bore 2 of the main shaft 1 and from this bore through the couplings 4 and through the distributing pipes 6, there can be no leakage of lubricant past the coupling.

Having thus described the invention, what I claim is:

In lubricating apparatus, an upright tubular member supported for rotation and through which lubricant is to be supplied, lubricant conducting means leading therefrom, a lubricant supply tube fitted into the upper end of the tubular member, the tubular member being provided at its upper end with a circumscribing outstanding collar the upper side of which is flush with the upper end of the tubular member, the supply tube being provided with a circumscribing shoulder having a threaded periphery, the shoulder resting at its under side rotatably upon the upper side of the collar, a sleeve interiorly threaded at its upper end and threaded through the shoulder upon the supply tube, the collar upon the tubular member being of a diameter equal substantially to the internal diameter of the sleeve whereby to rotatably fit within the sleeve below the shoulder upon the supply tube, a collar formed interiorly of the sleeve and fitting about the said tubular member below the collar upon said member, antifriction bearing means within the sleeve between the under side of the collar upon the tubular member and the upper side of the collar upon the sleeve, a bushing fitting the tubular member and fitting at its upper portion in the lower end of the sleeve, the sleeve at its lower end being exteriorly threaded, a packing within the sleeve between the upper end of the bushing and the under side of the collar within the sleeve, and a cap enclosing the lower portion of the said bushing and interiorly threaded and fitted to the threaded lower end of the sleeve, the said cap having a closed lower end provided with an opening receiving the tubular member for rotation and the said closed end of the cap engaging the lower end of the bushing.

In testimony whereof I affix my signature.

WILMER JOHNSTON.